(12) United States Patent
Cardonha et al.

(10) Patent No.: US 12,386,865 B2
(45) Date of Patent: *Aug. 12, 2025

(54) CONTEXT-AWARE TAGGING FOR AUGMENTED REALITY ENVIRONMENTS

(71) Applicant: Maplebear, Inc., San Francisco, CA (US)

(72) Inventors: Carlos H. Cardonha, Sao Paulo (BR); Fernando L. Koch, Sao Paulo (BR); James R. Kraemer, Santa Fe, NM (US)

(73) Assignee: Maplebear, Inc., San Francisco, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/227,346

(22) Filed: Apr. 11, 2021

(65) Prior Publication Data

US 2021/0233319 A1     Jul. 29, 2021

Related U.S. Application Data

(63) Continuation of application No. 15/847,345, filed on Dec. 19, 2017, now Pat. No. 10,997,788, which is a
(Continued)

(51) Int. Cl.
*G06F 16/29* (2019.01)
*G06F 16/2455* (2019.01)
(Continued)

(52) U.S. Cl.
CPC .......... *G06F 16/29* (2019.01); *G06F 16/2455* (2019.01); *G06F 16/5838* (2019.01);
(Continued)

(58) Field of Classification Search
CPC ............ G06T 19/006; G06F 16/5838; G06F 16/2455; G06F 16/5866; G06F 16/9537;
(Continued)

(56) References Cited

U.S. PATENT DOCUMENTS 5,727,147 A    3/1998  van Hoff
6,404,920 B1   6/2002  Hsu
(Continued)

OTHER PUBLICATIONS

Dell Acqua et al., "Colored Visual Tags: A Robust Approach for Augmented Reality" Proceedings of the IEEE Conference on Advanced Video and Signal Based Suveillance 05, 2005, pp. 423-427.
(Continued)

*Primary Examiner* — Cam Linh T Nguyen
(74) *Attorney, Agent, or Firm* — Fenwick & West LLP

(57) ABSTRACT

A method for tag-based search includes capturing an image, extracting a tag from the image, identifying a location associated with the captured image, and querying stored content for information that matches the location and the tag. Local storage is checked for the information first, and remote storage may be checked subsequently. Any located information may be used to augment the image. Information located in the remote storage may be saved in the local storage until it reaches a certain age, until it fails to be accessed for a threshold period of time, or until the location moves outside a threshold radius associated with a location of the information located in the remote storage.

20 Claims, 3 Drawing Sheets

Related U.S. Application Data continuation of application No. 14/985,559, filed on Dec. 31, 2015, now Pat. No. 9,905,051, which is a continuation of application No. 13/775,694, filed on Feb. 25, 2013, now Pat. No. 9,286,323.

(51) Int. Cl.

| | | |
|---|---|---|
| *G06F 16/58* | (2019.01) | |
| *G06F 16/583* | (2019.01) | |
| *G06F 16/587* | (2019.01) | |
| *G06F 16/9537* | (2019.01) | |
| *G06F 16/955* | (2019.01) | |
| *G06F 18/24* | (2023.01) | |
| *G06T 19/00* | (2011.01) | |
| *G09G 5/00* | (2006.01) | |

(52) U.S. Cl.
CPC ........ *G06F 16/5866* (2019.01); *G06F 16/587* (2019.01); *G06F 16/9537* (2019.01); *G06F 16/9554* (2019.01); *G06F 18/24* (2023.01); *G06T 19/006* (2013.01); *G09G 5/003* (2013.01); *G09G 2370/16* (2013.01)

(58) Field of Classification Search
CPC ..... G06F 16/9554; G06F 16/29; G06V 10/42; G06K 9/6267; G09G 5/003; G09G 2370/16
USPC .......................................................... 707/707
See application file for complete search history.

(56) References Cited

U.S. PATENT DOCUMENTS

| | | | |
|---|---|---|---|
| 6,507,837 B1 | 1/2003 | De La Huerga | |
| 7,171,540 B1* | 1/2007 | Seidl | G06F 12/1045 |
| | | | 710/305 |
| 7,953,746 B1* | 5/2011 | Garg | G06F 16/243 |
| | | | 707/762 |
| 8,315,465 B1 | 11/2012 | Baluja et al. | |
| 8,332,401 B2 | 12/2012 | Hull et al. | |
| 8,837,839 B1* | 9/2014 | Huber | G06V 10/762 |
| | | | 382/284 |
| 10,008,037 B1* | 6/2018 | Worley, III | G06T 7/00 |
| 10,617,568 B2* | 4/2020 | Boncyk | H04N 5/91 |
| 2001/0024525 A1 | 9/2001 | Hata et al. | |
| 2002/0167536 A1 | 11/2002 | Valdes et al. | |
| 2003/0169413 A1 | 9/2003 | Stanek | |
| 2004/0153519 A1 | 8/2004 | Stolze | |
| 2006/0015496 A1 | 1/2006 | Keating et al. | |
| 2006/0104494 A1 | 5/2006 | Collins et al. | |
| 2006/0210168 A1 | 9/2006 | Kim et al. | |
| 2006/0238334 A1 | 10/2006 | Mangan et al. | |
| 2007/0035562 A1 | 2/2007 | Azuma et al. | |
| 2007/0241196 A1 | 10/2007 | Yoon et al. | |
| 2008/0046715 A1* | 2/2008 | Balazs | H04L 63/0815 |
| | | | 713/152 |
| 2008/0147730 A1 | 6/2008 | Lee et al. | |
| 2008/0222105 A1* | 9/2008 | Matheny | G06F 16/9535 |
| 2008/0266323 A1 | 10/2008 | Biocca et al. | |
| 2008/0268876 A1 | 10/2008 | Gelfand et al. | |
| 2008/0298659 A1 | 12/2008 | Spence et al. | |
| 2009/0279772 A1 | 11/2009 | Sun et al. | |
| 2009/0309731 A1 | 12/2009 | Chan | |
| 2010/0042469 A1* | 2/2010 | Chandrasekar | G06Q 30/0256 |
| | | | 705/14.1 |
| 2010/0076976 A1 | 3/2010 | Sotirov et al. | |
| 2010/0138446 A1 | 6/2010 | Canessa et al. | |
| 2010/0310182 A1 | 12/2010 | Kroepfl et al. | |
| 2010/0313210 A1* | 12/2010 | Lin | H04L 61/4552 |
| | | | 719/328 |
| 2011/0009162 A1* | 1/2011 | Ahn | G06Q 30/06 |
| | | | 455/556.1 |
| 2011/0052083 A1 | 3/2011 | Rekimoto | |
| 2011/0138416 A1 | 6/2011 | Kang et al. | |
| 2011/0188742 A1 | 8/2011 | Yu et al. | |
| 2011/0196886 A1* | 8/2011 | Ho | G16H 30/20 |
| | | | 707/769 |
| 2011/0199185 A1 | 8/2011 | Karaoguz et al. | |
| 2011/0216179 A1 | 9/2011 | Dialameh et al. | |
| 2011/0242134 A1 | 10/2011 | Miller et al. | |
| 2011/0251972 A1 | 10/2011 | Martin | |
| 2012/0018518 A1 | 1/2012 | Ström et al. | |
| 2012/0027301 A1 | 2/2012 | Schloter et al. | |
| 2012/0037700 A1 | 2/2012 | Walji et al. | |
| 2012/0084348 A1* | 4/2012 | Lee | G06Q 30/0261 |
| | | | 709/203 |
| 2012/0096490 A1 | 4/2012 | Barnes | |
| 2012/0198197 A1 | 8/2012 | Gladwin et al. | |
| 2012/0232966 A1 | 9/2012 | Calman et al. | |
| 2012/0278348 A1 | 11/2012 | Chardon et al. | |
| 2012/0296453 A1 | 11/2012 | Prentice et al. | |
| 2013/0050194 A1 | 2/2013 | Makino et al. | |
| 2013/0050500 A1 | 2/2013 | Makino et al. | |
| 2013/0088515 A1* | 4/2013 | Choi | G06T 19/006 |
| | | | 345/633 |
| 2013/0110484 A1 | 5/2013 | Hu et al. | |
| 2013/0129174 A1 | 5/2013 | Grbic et al. | |
| 2013/0129252 A1* | 5/2013 | Lauper | G06F 16/489 |
| | | | 382/276 |
| 2013/0162676 A1* | 6/2013 | Taylor | G06T 7/75 |
| | | | 382/190 |
| 2013/0198197 A1 | 8/2013 | Sawhney et al. | |
| 2013/0271491 A1 | 10/2013 | Anderson | |
| 2013/0318346 A1* | 11/2013 | Libonate | H04L 43/16 |
| | | | 713/168 |
| 2014/0063237 A1 | 3/2014 | Stone et al. | |
| 2014/0132629 A1 | 5/2014 | Pandey et al. | |
| 2014/0168264 A1 | 6/2014 | Harrison et al. | |
| 2014/0172912 A1* | 6/2014 | Morris | H04W 4/60 |
| | | | 707/770 |
| 2014/0188756 A1 | 7/2014 | Ponnavaikko et al. | |

OTHER PUBLICATIONS

International Search Report and Written Opinion of PCT/US2014/015757, dated Jul. 8, 2014, pp. 1-17.

Iso et al., "Visual-Tag Reader: Image Capture by Cell Phone Camera" International Conference on Image Processing, 2003. Consists of 4 unnumbered pages.

Kim et al., "CAMAR Tag Framework: Context-Aware Mobile Augmented Reality Tag Framework for Dual-reality Linkage" Proceedings of International Symposium on Ubiquitous Virtual Reality 09, 2009. pp. 39-42.

Lee et al., "Tag Detection Algorithm for Improving the Instability Problem of an Augmented Reality" Proceedings of IEEE/ACM International Symposium on Mixed Augmented Reality 06, 2006. pp. 257-258.

Perez-Cabre et al., "Remote Optical ID Tag Recognition and Verification Using Fully Spatial Phase Multiplexing" Proceedings of SPIE, 2005. pp. 1-13.

Rekimoto et al., "CyberCode: Designing Augmented Reality Environments with Visual Tags" Proceedings of Dare 2000 on Designing augmented reality environments, 2000. pp. 1-10.

United States Office Action, U.S. Appl. No. 15/847,345, Oct. 28, 2020, seven pages.

United States Office Action, U.S. Appl. No. 15/847,345, Jul. 21, 2020, 13 pages.

United States Office Action, U.S. Appl. No. 15/847,345, Mar. 4, 2020, 14 pages.

United States Office Action, U.S. Appl. No. 14/985,559, Nov. 1, 2016, six pages.

United States Office Action, U.S. Appl. No. 13/775,694, Sep. 14, 2015, eight pages.

United States Office Action, U.S. Appl. No. 13/775,694, May 13, 2015, 15 pages.

United States Office Action, U.S. Appl. No. 13/775,694, Jan. 5, 2015, 13 pages.

(56) References Cited

OTHER PUBLICATIONS

United States Office Action, U.S. Appl. No. 13/775,694, Aug. 15, 2014, 13 pages.

* cited by examiner

CONTEXT-AWARE TAGGING FOR AUGMENTED REALITY ENVIRONMENTS

CROSS REFERENCE TO RELATED APPLICATIONS

This application is a continuation of U.S. application Ser. No. 15/847,345, filed on Dec. 19, 2017, which is a continuation of U.S. application Ser. No. 14/985,559, filed on Dec. 31, 2015, now U.S. Pat. No. 9,905,051, which is a continuation of U.S. application Ser. No. 13/775,694, filed on Feb. 25, 2013, now U.S. Pat. No. 9,286,323, each of which is incorporated by reference in its entirety.

BACKGROUND

The present invention relates generally to mobile computing and relates more specifically to context recognition for mobile computing applications.

Context recognition allows the functions of mobile devices to be adapted to better meet the needs of the mobile devices' users. Typically, context recognition involves extracting and recognizing implicit context information from a mobile device's usage situations and environment. For instance, context may be inferred based on the mobile device's location and/or orientation (e.g., as indicated by one or more sensors integrated in the mobile device, such as a location sensor, a camera/imaging element, an accelerometer, or the like). In situations where location and orientation may not be enough to infer context, machine readable labels or tags (e.g., bar codes or matrix codes) may provide additional contextual information.

Mobile devices, however, may not be able to retrieve information from these tags effectively or efficiently due to the limited resources (e.g., computing power, bandwidth, physical memory, and the like) available in their small form factors. What is more, the resources that are available are typically shared by many operations; they cannot be dedicated to capturing, processing, recognizing, and contextualizing images and tags, which are nontrivial tasks that may require additional pre-processing. For instance, the quality of the images captured by most mobile devices is relatively low, and pre-processing may be required to compensate for distortion, blur, skew, low resolution, or the like before the images can be processed further. Moreover, as tags themselves become more complex (e.g., as in the case of matrix codes or multidimensional barcodes), so do the recognition methods required to retrieve information from the tags.

SUMMARY

A method for tag-based search includes capturing an image, extracting a tag from the image, identifying a location associated with the captured image, and querying stored content for information that matches the location and the tag. Local storage is checked for the information first, and remote storage may be checked subsequently. Any located information may be used to augment the image. Information located in the remote storage may be saved in the local storage until it reaches a certain age, until it fails to be accessed for a threshold period of time, or until the location moves outside a threshold radius associated with a location of the information located in the remote storage.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for context-aware tagging for augmented reality environments. Embodiments of the invention perform context recognition by cross-relating collected geo-location information (e.g., longitude, latitude, altitude, direction, etc. as obtained from an open-air tracking system such as a global positioning system, Bluetooth beacons, cellular communications towers, radio frequency identification tags, or the like) with classified tag markers (e.g., bar codes, color codes, or the like) in a captured image. The tag markers may utilize visual, electronic, radio, infrared, ultraviolet, and/or other communications techniques. In some embodiments, the tag identifiers are non-unique, but uniqueness is resolved based on geographic and/or directional context. This creates a context within which the physical elements in the captured image can be classified.

Figure 1:
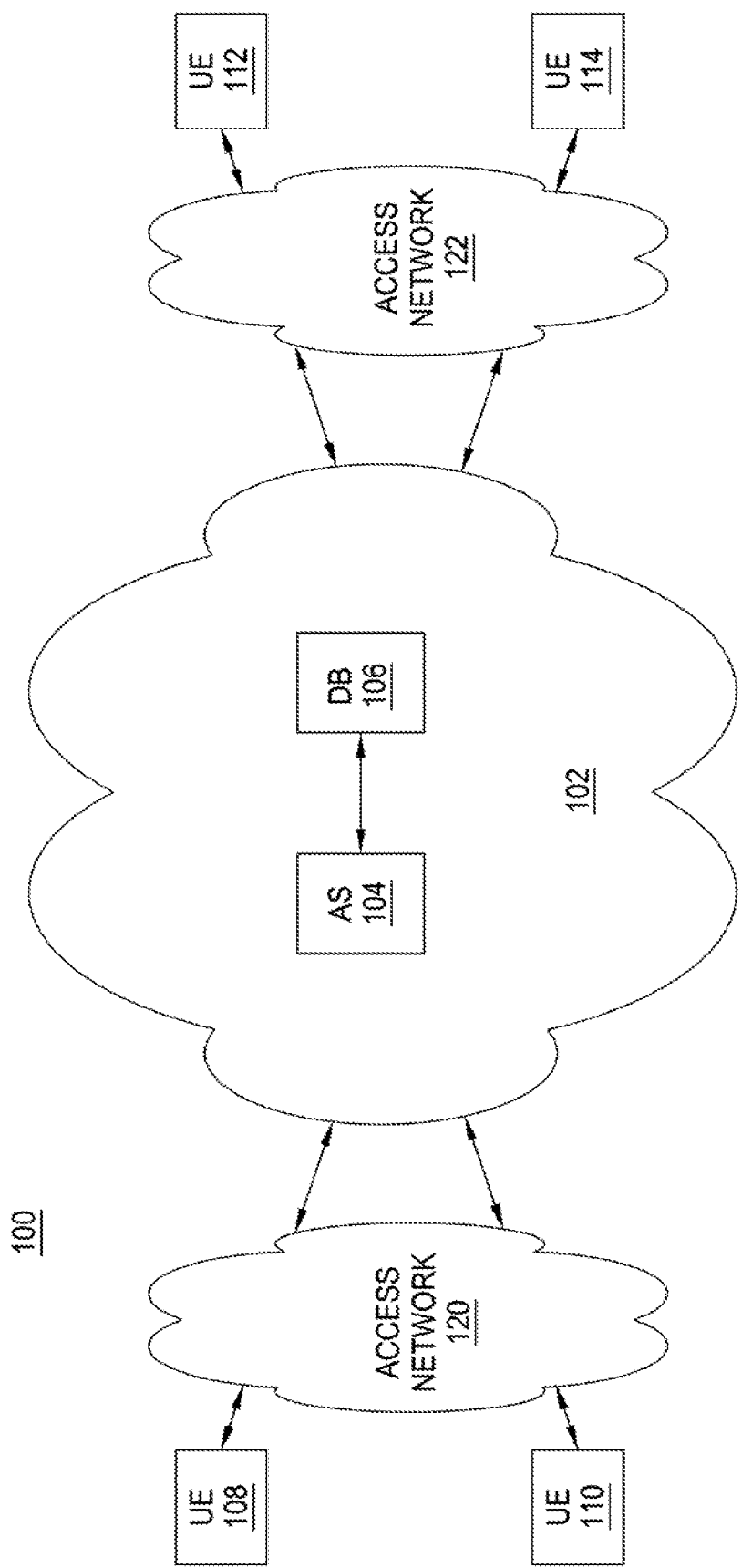
FIG. 1 is a block diagram depicting one example of a network within which embodiments of the present invention may be deployed.

FIG. 1 is a block diagram depicting one example of a network 100 within which embodiments of the present invention may be deployed. The network 100 may be any type of communications network, such as for example, an Internet Protocol (IP) network (e.g., an IP Multimedia Subsystem (IMS) network, an asynchronous transfer mode (ATM) network, a wireless network, a cellular network, a long term evolution (LTE) network, and the like). An "IP network" is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, in one embodiment, the core network 102 comprises a portion of a cloud environment in which services and applications are supported in a highly distributed manner.

In one embodiment, the AS 104 is a content server. For instance, the AS 104 may run queries against the DB 106 to locate content based on tag and/or location data, as discussed in further detail below.

In one embodiment, the DB 106 is a tag database that stores a content with which tags have been associated. In one embodiment, the DB 106 stores the relationship between tag identifier ("tag-id"), location, and elements for each item of content. In a further embodiment, the DB 106 also stores a distribution of similar tags for a given location or region. In one embodiment, the DB 106 stores content relating to a plurality of subjects. In a further embodiment, multiple DBs 106 may each store content relating to a different specific subject. Additionally, the DB 106 may store augmented content generated by user endpoint devices according to methods of the present invention that are described in greater detail below. This information may be stored in encrypted form in order to protect any information that is deemed to be sensitive (e.g., geolocation data).

Figure 3:
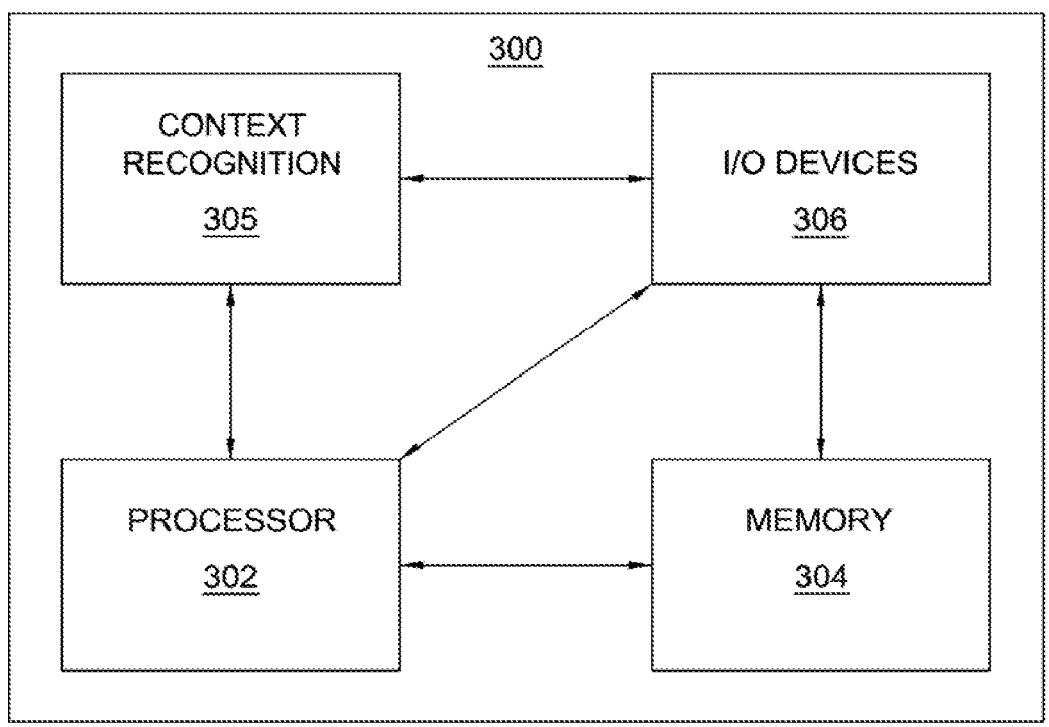
FIG. 3 is a high-level block diagram of the context recognition method that is implemented using a general purpose computing device.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114. In one embodiment, any of the user endpoint devices 108, 110, 112 and 114 may comprise a general purpose computer, as illustrated in FIG. 3 and discussed below. In one embodiment, the user endpoint devices 108, 110, 112 and 114 may perform, in conjunction with the AS 104, the methods and algorithms discussed below related to context-aware tagging. For instance, at least some of the user endpoint devices 108, 110, 112 and 114 may comprise mobile devices having integrated sensors that capture information from which context can be inferred.

In one embodiment, the user endpoint devices 108, 110, 112 and 114 may be any type of endpoint device that is capable of accessing services from a cloud-based service provider, such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed. In one embodiment, any of the user endpoint devices may have one or more sensors integrated therein. These sensors may include, for example, location sensors, environmental sensors, acoustic sensors, position sensors, optical sensors, pressure sensors, proximity sensors, imaging sensors, and the like. The AS 104 may subscribe to the outputs of these sensors.

It should be noted that the network 100 has been simplified. For example, the network 100 may include other network elements (not shown) such as border elements, routers, switches, policy servers, security devices, a content distribution network (CDN) and the like.

Figure 2:
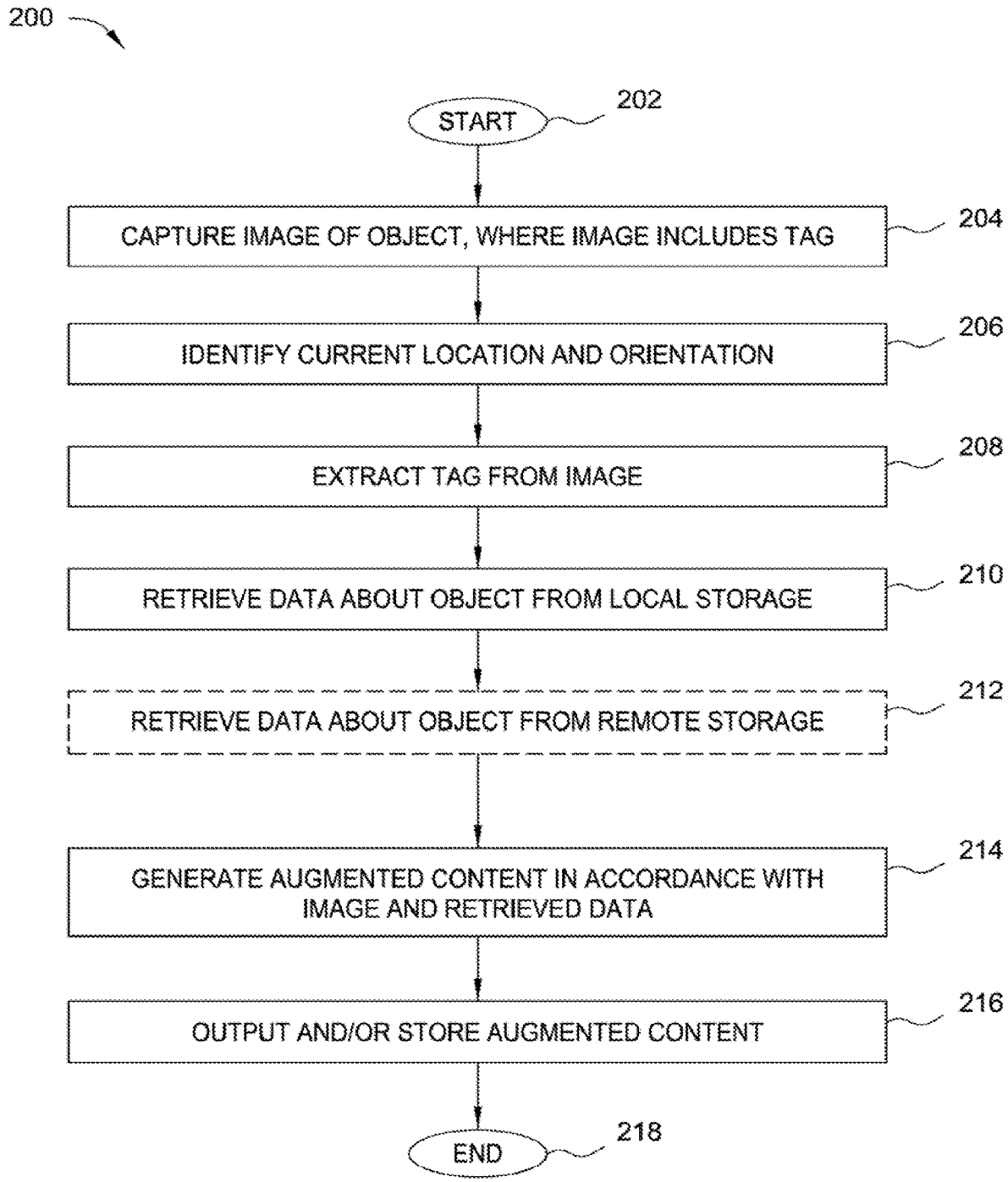
FIG. 2 is a flow diagram illustrating one embodiment of a method for context-aware tagging, according to the present invention.

FIG. 2 is a flow diagram illustrating one embodiment of a method 200 for context-aware tagging, according to the present invention. The method 200 may be executed, for example, by any of the user endpoint devices 108, 110, 112 and 114 illustrated in FIG. 1. As such, and for the purposes of illustration, reference is made in the discussion of the method 200 to exemplary user endpoint device 108. However, it will be appreciated that the method 200 may be executed on devices other than or in addition to the user endpoint device 108.

The method 200 begins in step 202. In step 204, the user endpoint device 108 captures an image of an object in proximity to the user endpoint device 108. The image is captured using an imaging sensor (e.g., camera) integrated in the user endpoint device 108. The image includes at least one tag (e.g., a bar code, a color code, or the like). For instance, the image may depict a tree to which a machine readable label is affixed.

In step 206, the user endpoint device 108 identifies its current location (i.e., the location from which the image is captured in step 204) and orientation using one or more geolocation sensors integrated in the user endpoint device (e.g., a location sensor, an environmental sensor, a position sensor, a proximity sensor, an accelerometer, or the like). For instance, a global positioning sensor may provide the user endpoint device's current positional coordinates (e.g., latitude, longitude, altitude, direction, etc.), while an accelerometer may provide the current orientation of the user endpoint device 108. In one embodiment, the location and orientation are periodically saved to local storage (e.g., cache) on the user endpoint device 108, and the user endpoint device 108 simply retrieves the most recent saved location and position in step 206. In another embodiment, the current location and position are identified on-demand in step 206 and subsequently saved to the local storage.

In step 208, the user endpoint device 108 extracts the tag from the image captured in step 204. In one embodiment, the tag is extracted using one or more image processing techniques that recognize the tag and identify its features.

In step 210, the user endpoint device 108 retrieves data about the object from the user endpoint device's local storage (e.g., cache and/or tag database). This data may be retrieved by querying the local storage for content whose tags match the tag extracted from the image in step 208. The query also includes the current position and orientation of the user endpoint device 108. In one embodiment, the data retrieved in step 210 includes content identified based on statistical analysis of possible tags associated with the current location, based on similarity of elements present in the current location. For instance, continuing the above example, the probability of the image depicting a specific species of tree can be inferred based on a model of the statistical distribution of similar species present in the current location (e.g., models of biomass distribution).

In optional step 212 (illustrated in phantom), the user endpoint device 108 retrieves data about the object from remote storage, such as the DB 106. This data may be retrieved by querying the remote storage for content whose tags match the tag extracted from the image in step 208. The query also includes the current position and orientation of the user endpoint device 108. In one embodiment, the data retrieved in step 212 includes content identified based on statistical analysis of possible tags associated with the current location, based on similarity of elements present in the current location. In one embodiment, at least some of the data retrieved from the remote storage is subsequently stored in the local storage (along with its tag(s) and related location/position data). In one embodiment, step 212 is only performed when the data retrieved in step 210 is determined to be insufficient and/or incomplete.

In step 214, the user endpoint device 108 generates augmented content in accordance with the image captured in step 204 and the data retrieved in steps 210 and/or 212. For instance, based on the example described above, the augmented content may comprise an image of the tree with information about the tree (e.g., name, genus, species, group, etc.) visually superimposed over the image.

In step 216, the user endpoint device 108 outputs the augmented content. For instance, the user endpoint device 108 may display an augmented image of the object on a display of the user endpoint device 108. In one embodiment, the augmented content is stored either locally on the device or remotely (e.g., on the DB 106).

The method 200 ends in step 218.

As discussed above, various data that facilitates context-aware tagging, including the location and position of the user endpoint device 108 and content retrieved from remote storage, is saved in the local storage of the user endpoint device 108. In one embodiment this data is saved only temporarily. For instance, the data may be deleted from the local storage if it reaches a certain age or is not accessed for a threshold period of time. In a further embodiment, data that relates to objects that are outside a threshold radius from the user endpoint device's current location ("proximity region") is also deleted.

Thus, the method 200 provides a hybrid approach augmented reality that combines positioning information with context-based local tags. Local and remote content is interwoven expedite recognition of context and to reduce the need for communication with remote devices. Specifically, the method 200 first attempts to recognize context and satisfy data requests using locally stored content before querying remote data sources. Any data that is retrieved from remote sources is stored locally at least temporarily, based on the immediate needs to the user endpoint device 108. The user endpoint device 108 can therefore accurately recognize context and satisfy data requests while minimizing the size of the tag database that (e.g., local and remote storage) that must be maintained to do so.

Moreover, by cross-relating geolocation and tag-captured information, the amount of processing and communications required to recognize context and satisfy data requests can be significantly reduced. This allows the amount of information required to be stored with the tags to be likewise reduced, accepting non-uniqueness in tag identifiers.

The above-described advantages make the present invention especially well-suited to mobile devices and other small form factor devices that are characterized by limited memory and/or communication capabilities, although the present invention is not so limited.

FIG. 3 is a high-level block diagram of the context recognition method that is implemented using a general purpose computing device 300. The general purpose computing device 300 may comprise, for example, any of the user endpoint devices 108, 110, 112 and 114 illustrated in FIG. 1. In one embodiment, a general purpose computing device 300 comprises a processor 302, a memory 304, a context recognition module 305 and various input/output (I/O) devices 306 such as a display, a keyboard, a mouse, a sensor, a stylus, a microphone or transducer, a wireless network access card, an Ethernet interface, and the like. In one embodiment, at least one I/O device is a storage device (e.g., a disk drive, an optical disk drive, a floppy disk drive). In one embodiment, the memory 304 includes cache memory, including a tag database that stores the relationship between tag identifier, location, and elements. In a further embodiment, the tag database also stores a distribution of similar tags for a given location or region. It should be understood that the context recognition module 305 can be implemented as a physical device or subsystem that is coupled to a processor through a communication channel.

Alternatively, the context recognition module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the context recognition module 305 for context-aware tagging for augmented reality environments, as described herein with reference to the preceding figures, can be stored on a tangible computer readable storage medium or device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method comprising:
   extracting, by a mobile device, a machine-readable label from an image of a first object captured by the mobile device;
   matching, by the mobile device, the extracted machine-readable label to a local entry for the first object in a local data store stored on the mobile device, wherein the local data store contains entries for a distribution of objects, wherein each entry comprises identifying information for an object of the distribution of objects, and wherein the distribution of objects describes a distribution of a set of objects, wherein the set of objects consists of objects that share characteristics and are within a proximity from the mobile device when the image of the first object is captured;
   inferring, by the mobile device, an identity of the first object based on identifying information from the local entry for the first object;
   querying a remote database for one or more content elements associated with the inferred identity of the first object by transmitting a query including the inferred identity of the first object from the local data store, wherein the remote database stores, for each object of a plurality of objects, the identifier and additional content elements about the object; and
   generating for display on the mobile device content that comprises the queried one or more content elements for the first object.

2. The method of claim 1, wherein the remote database stores augmented content generated by users from one or more other mobile devices, and wherein the additional content elements comprise the augmented content.

3. The method of claim 1, wherein the machine-readable label is a bar code.

4. The method of claim 1, wherein the inferring comprises:
   determining a probability that the first object matches the inferred identity.

5. The method of claim 1, further comprising:
   capturing, by the mobile device, a location of the mobile device when the image of the first object is captured,
   wherein the query includes the location of the first object corresponding to the captured location.

6. The method of claim 5, further comprising:
   capturing, by the mobile device, an orientation of the mobile device when the image of the first object is captured,
   wherein the query includes the orientation.

7. The method of claim 1, wherein the location associated with the mobile device is identified using information from an open-air tracking system.

8. The method of claim 1, wherein the open-air tracking system is a Global Positioning System.

9. The method of claim 1, wherein the generating comprises:
   superimposing the queried one or more content elements over the image of the first object.

10. The method of claim 1, further comprising:
    updating which objects are in the set of objects of the distribution of objects based on location data from the mobile device.

11. A computer program product comprising a non-transitory computer-readable storage medium containing computer program code for:
    extracting, by a mobile device, a machine-readable label from an image of a first object captured by the mobile device;
    matching, by the mobile device, the extracted machine-readable label to a local entry for the first object in a local data store stored on the mobile device, wherein the local data store contains entries for a distribution of objects, wherein each entry comprises identifying information for an object of the distribution of objects, and wherein the distribution of objects describes a distribution of a set of objects, wherein the set of objects consists of objects that share characteristics and are within a proximity from the mobile device when the image of the first object is captured;
    inferring, by the mobile device, an identity of the first object based on identifying information from the local entry for the first object;
    querying a remote database for one or more content elements associated with the inferred identity of the first object by transmitting a query including the inferred identity of the first object from the local data store, wherein the remote database stores, for each object of a plurality of objects, the identifier and additional content elements about the object; and
    generating for display on the mobile device content that comprises the queried one or more content elements for the first object.

12. The computer program product of claim 11, wherein the remote database stores augmented content generated by users from one or more other mobile devices, and wherein the additional content elements comprise the augmented content.

13. The computer program product of claim 11, wherein the machine-readable label is a bar code.

14. The computer program product of claim 11, wherein the inferring comprises:
    determining a probability that the first object matches the inferred identity.

15. The computer program product of claim 11, wherein the computer-readable storage medium further contains computer program code for:
    capturing, by the mobile device, a location of the mobile device when the image of the first object is captured,
    wherein the query includes the location of the first object corresponding to the captured location.

16. The computer program product of claim 15, wherein the computer-readable storage medium further contains computer program code for:
    capturing, by the mobile device, an orientation of the mobile device when the image of the first object is captured,
    wherein the query includes the orientation.

17. The computer program product of claim 11, wherein the location associated with the mobile device is identified using information from an open-air tracking system.

18. The computer program product of claim 17, wherein the open-air tracking system is a Global Positioning System.

19. The computer program product of claim 11, wherein the generating comprises:
    superimposing the queried one or more content elements over the image of the first object.

20. The computer program product of claim 11, wherein the computer-readable medium further contains computer program code for:
    updating which objects are in the set of objects of the distribution of objects based on location data from the mobile device.

* * * * *